United States Patent

Schecker et al.

[15] 3,686,339
[45] Aug. 22, 1972

[54] CONTINUOUS MANUFACTURE OF 1-METHYL-3-PHENYL-INDANS

[72] Inventors: Hans-Georg Schecker; Waldemar Koehler, both of Ludwigshafen; Herbert Armbrust; Hans Juergen Sturm, both of Gruenstadt; Gerhard Kilpper, Mannheim, all of Germany

[73] Assignee: Badische Anilin- & Soda-Fabrik Aktiengesellschaft, Ludwigshafen/Rhine, Germany

[22] Filed: Oct. 5, 1970

[21] Appl. No.: 78,160

[30] Foreign Application Priority Data

Oct. 7, 1969    Germany..........P 19 50 434.8

[52] U.S. Cl. ............................260/668 F, 260/669 P
[51] Int. Cl.............................................C07c 15/20
[58] Field of Search........................260/668 F, 669 P

[56] References Cited

UNITED STATES PATENTS

| | | | |
|---|---|---|---|
| 2,249,987 | 7/1941 | Stanley et al. | 260/668 F |
| 2,646,450 | 7/1953 | Thurber | 260/668 F |
| 3,385,905 | 5/1968 | Smith et al. | 260/669 P |
| 3,523,981 | 8/1970 | Ottmann et al. | 260/668 F |

*Primary Examiner*—Curtis R. Davis
*Attorney*—Johnston, Root, O'Keeffe, Keil, Thompson & Shurtleff

[57] ABSTRACT

Continuous manufacture of 1-methyl-3-phenylindans by dimerization of styrene in the presence of acid and specific concentrations of starting material and end product. The products are starting materials for the manufacture of dyes and pesticides.

9 Claims, No Drawings

CONTINUOUS MANUFACTURE OF 1-METHYL-3-PHENYL-INDANS

This invention relates to a process for the continuous manufacture of 1-methyl-3-phenylindans by dimerizing styrene in the presence of acid and specific concentrations of starting material and end product.

It is known to dimerize styrene in the presence of phosphoric acid or sulfuric acid at elevated temperature to form a mixture of 1,3-diphenyl-butene-1 and 1-methyl-3-phenylindan (J.Org.Chem, 19, 17 et seq. (1954) and 27, 1636 et seq. (1962); J.Chem.Soc., 1573 et seq. (1964); Organic Synthesis, coll. vol. IV, 665 et seq.). The process comprises a complicated system of side and secondary reactions. The first step involves the dimerization of monomeric styrene to 1,3-diphenylbutene-1 which gives rise to the structural isomers of the cis and trans forms. Cyclization of the trans form to the indan follows as a secondary reaction. Starting from the cis and trans isomers, trimers and higher polymers of styrene are formed as further undesirable byproducts.

All these processes are economically unsatisfactory for large-scale operation. At high rates of reaction (space-time yields of up to 1.4 kg indan per liter of reaction space per hour) the yields of end product do not exceed 30 percent of the theory, based on styrene fed in. At low reaction rates the yields are up to 80 percent of the theory, but the space-time yields are low (approx. 0.01 kg per liter per hour).

It is an object of the present invention to provide a new method of continuously producing 1-methyl-3-phenylindans in a simpler and more economical manner, in better yields and space-time yields and in high purity.

We have found that 1-methyl-3-phenylindans having the general formula

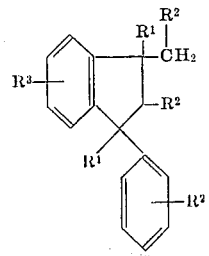

I where $R^1$, $R^2$ and $R^3$ may be identical or different and each denotes alkyl or hydrogen and $R^3$ may also be halogen are advantageously obtained in the dimerization of styrene in the presence of acid at elevated temperature when the reaction is carried out continuously at a concentration of less than 10 percent w/w of styrene having the general formula

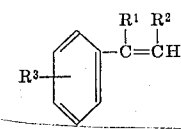

II where $R^1$, $R^2$ and $R^3$ have the meanings given above and a concentration of more than 60 percent w/w of indan having the formula I, percentages based on the organic phase of the two-phase reaction mixture, in the presence of phosphoric acid, sulfuric acid and/or a haloalkane-carboxylic acid.

When styrene is used the reaction may be illustrated by the equation

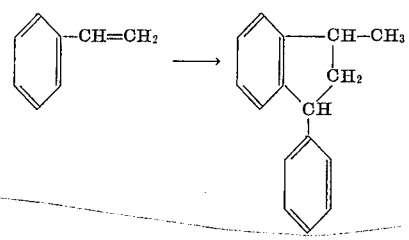

As compared with prior processes, the process of the invention gives 1-methyl-3-phenylindans in a simpler and more economical manner, in better yields and space-time yields and in high purity. The yields of end product vary from 65 to 80 percent of the theory, based on styrene reacted, at space-time yields of from 1 to 3 kg per liter of reaction space per hour. Considering the state of the art these beneficial results are surprising.

Preferred starting materials having the general formula II and therefore preferred end products I are those in whose formulas $R^1$, $R^2$ and $R^3$ are identical or different and each denotes alkyl having from one to four carbon atoms or hydrogen, and in which $R^3$ may additionally denote chlorine or bromine. Examples of starting materials are styrene, o-chlorostyrene, p-bromostyrene, p-methylstyrene, α-methylstyrene, β-propylstyrene, α,β-dimethylstyrene, and α-dimethylstyrene.

It is an essential feature of the invention that the styrene II used is present throughout the reaction in a concentration of less than 10 percent w/w, preferably less than 5 percent w/w, and the corresponding 1-methyl-3-phenylindan I obtained as the end product is present in a concentration of more than 60 percent w/w, preferably 70 to 90 percent w/w, based on the organic phase of the two-phase mixture. In addition to starting material and end product the organic phase contains the byproducts formed in the reaction, e.g. 1,3-diphenylbutene-(1) and styrene polymers. If desired, the process may be carried out in the pressure of solvents which are inert under the reaction conditions, e.g. aliphatic hydrocarbons such as n-pentane or n-heptane, cycloaliphatic hydrocarbons such as cyclohexane, or mixtures thereof.

The aqueous phase of the reaction mixture contains the acid and any water present. Suitable acids are phosphoric acid, sulfuric acid and/or haloalkanecarboxylic acid, expediently in a ratio of from 4 to 0.25, preferably 2 to 0.5 part v/v of acid per part by volume of organic phase. The acids may be used in concentrated form or in admixture with water. Examples are meta-, pyro- and particularly orthophosphoric acids, expediently as aqueous solutions, containing 60 to 80 percent w/w phosphorus pentoxide; aqueous 50 to 80 percent w/w sulfuric acid; mono-, di- and trichloroacetic acids; and chloropropionic acid.

The reaction is carried out continuously and as a rule at a temperature of from 55° to 180° C, preferably 80° to 150°, at subatmospheric or superatmospheric pressure, e.g. 0.3 to 3 atmospheres, or preferably at atmospheric pressure. An advantageous embodiment of the reaction is as follows: Styrene II is dimerized at the reaction temperature in the presence of acid and the corresponding indan I in the specified concentrations in a stirred vessel or cascade of stirred vessels with intense stirring, preferably with a power input of from 5 to 10 kW/m³. By supplying starting material and withdrawing reaction product at the appropriate rates the said concentrations of starting material and end product in the organic phase of the mixture are maintained throughout the reaction. The residence time of the reaction mixture in the reaction space is usually from 10 to 30 minutes. At the beginning of the reaction the mixture of the reactants may be produced at the reaction temperature, or it may be prepared at a lower temperature and then heated to the reaction temperature. If a cascade is used, the individual vessels may be operated at different temperatures.

That portion of the reaction mixture which is continuously withdrawn is subjected to phase separation. The aqueous phase which contains the acid may be reused for the reaction without processing or it may be worked up in conventional manner, for example by filtration, centrifuging, distillation or extraction. In the cascade, each vessel may have its own acid loop, or all vessels may have a common acid loop. In the former case, the acid concentration may vary from one vessel to another.

The end product is separated from the organic phase in conventional manner, e.g. by distillation.

The compounds obtainable by the process of the invention are valuable starting materials for the manufacture of dyes and pesticides. As regards their utility, reference is made to the said publications.

The invention is further illustrated by the following Examples in which the parts are by weight, bearing the same relation to parts by volume as the kilogram to the liter.

EXAMPLE 1

100 parts of styrene is supplied per hour to a continuous reactor equipped with stirring means and containing 55 parts of phosphoric acid (93 wt. percent) and 32 parts of 1-methyl-3-phenylindan. The reaction mixture is intensely stirred at a temperature between 140° and 150° C. Approx. 100 parts of reaction mixture is withdrawn per hour. Throughout the reaction the content of styrene in 100 parts of organic phase is less than two parts, while the content of 1-methyl-3-phenylindan is 75 parts. That portion of the reaction mixture which is discharged passes to a separator through a lateral outlet. The phosphoric acid which separates as the lower phase is returned to the reactor, while the organic phase is fractionally distilled.

For every 100 parts of reacted styrene there are obtained 9.4 parts of 1,3-diphenylbutene-1, 74.5 parts of 1-methyl-3-phenylindan, b.p. 150° C (6.5 mm), and 16.1 parts of higher polymers of styrene.

The space-time yield is 1.2 kg per hour per liter.

EXAMPLE 2

300 parts per hour of styrene is added per hour to 55 parts of phosphoric acid (93 wt percent) and 32 parts of 1-methyl-3-phenylindan in the manner described in Example 1. The reaction temperature is 150° C. Approx. 300 parts of reaction mixture is withdrawn per hour. The content of styrene in the reaction mixture is about 4 parts in 100 parts of organic phase. That portion of the reaction mixture which is withdrawn passes to a separator through a lateral outlet. The phosphoric acid which separates is returned to be reactor.

For every 100 parts of reacted styrene there are obtained 16.0 parts of 1,3-diphenylbutene-1, 67.2 parts of 1-methyl-3-phenylindan and 16.8 parts of higher polymers of styrene.

The space-time yield is 3.0 kg per hour per liter.

What we claim is:

1. A process for the continuous production of 1-methyl-3-phenylindans having the general formula

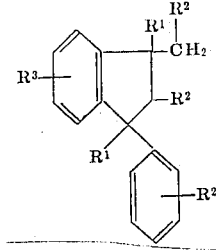

I where $R^1$, $R^3$ may be identical or different and each denotes alkyl or hydrogen and $R^3$ may also be halogen by dimerization of styrene in the presence of acid at elevated temperature wherein the reaction is carried out continuously at a concentration of less than 10 percent w/w of styrene having the general formula

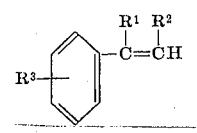

II where $R^1$, $R^2$ and $R^3$ have the meanings given above and a concentration of more than 60 percent w/w of indan having the formula I, percentages based on the organic phase of the two-phase reaction mixture, in the presence of at least one member selected from the group consisting of phosphoric acid, sulfuric acid and a haloalkanecarboxylic acid.

2. A process as claimed in claim 1 wherein the concentration of styrene is less than 5 percent w/w.

3. A process as claimed in claim 1 wherein the concentration of indan is 70 to 90 percent w/w, based on the organic phase of the two-phase reaction mixture.

4. A process as claimed in claim 1 carried out in the presence of an organic solvent which is inert under the reaction conditions.

5. A process as claimed in claim 1 wherein 4 to 0.25 part by volume of acid, calculated 100 percent, is used per part by volume of organic phase.

6. A process as claimed in claim 1 wherein 2 to 0.25 part by volume of acid, calculated 100 percent, is used per part by volume of organic phase.

7. A process as claimed in claim 1 carried out at a temperature of from 55° to 180° C.

8. A process as claimed in claim 1 carried out at a temperature of from 80° to 150° C.

9. A process as claimed in claim 1 wherein $R^1$, $R^2$ and $R^3$ may be identical or different and each denotes alkyl having from one to four carbon atoms or hydrogen, and $R^3$ may additionally denote chlorine or bromine.

* * * * *